United States Patent Office 2,856,348
Patented Oct. 14, 1958

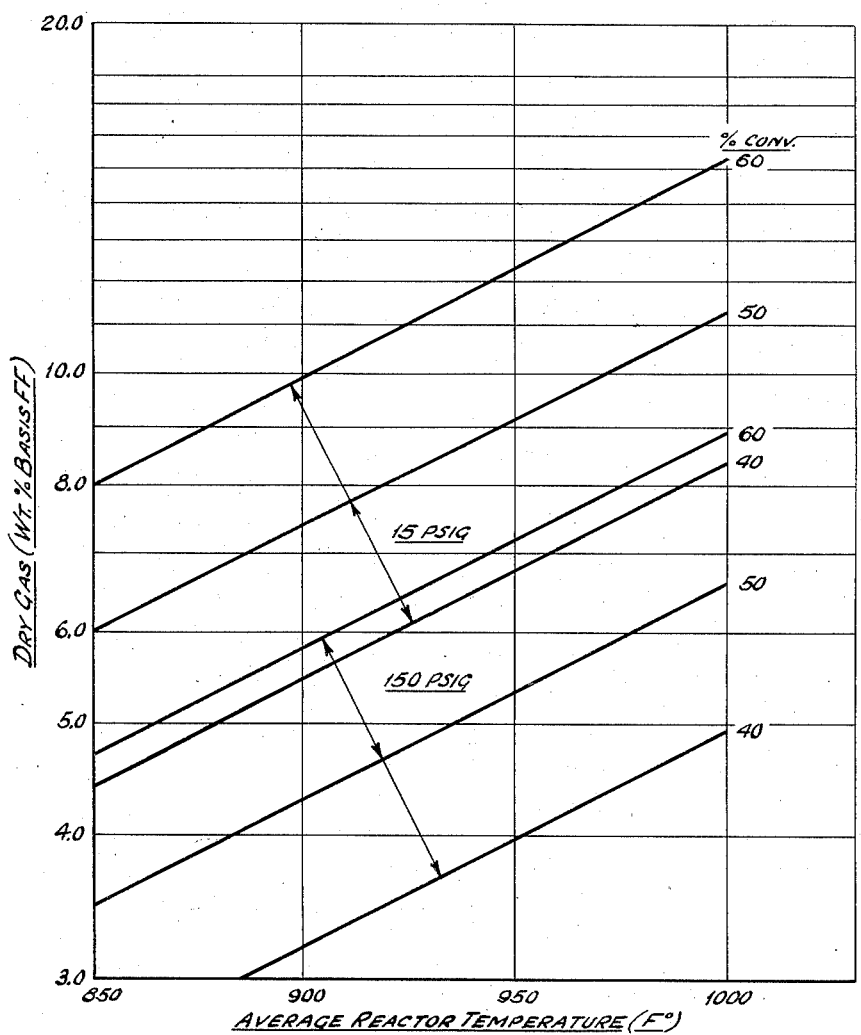

2,856,348

FLUID CATALYST CRACKING OF HYDROCARBON OILS

Alfred R. Vander Ploeg and Samuel P. Dickens, Port Arthur, Tex., assignors to The Texas Company, New York, N. Y., a corporation of Delaware Application December 27, 1954, Serial No. 477,907

1 Claim. (Cl. 208—120)

This invention relates to certain improvements in the fluid catalyst cracking of hydrocarbon oils and is concerned with obtaining increased yields of gasoline without an accompanying depreciation in octane value.

Heretofore it has been known that increasing pressure in catalytic cracking resulted in decreasing the formation of fixed gas and in increasing the yield of gasoline but raising the pressure did not appear to offer any improvement in the process because of the reduced octane number of the gasoline product. Consequently fluid catalyst cracking operations have been conducted at low pressures such as approximately atmospheric or some 15 or 20 pounds per square inch.

We have discovered that increasing the temperature at elevated pressures produces effects radically different from those resulting from the application of increasing temperatures under low pressures, and that increasing the temperature at the elevated pressures enables not only the expected high yield of gasoline due to the increased pressure to be realized but also the avoidance in depreciation in octane value.

The invention is best explained by reference to the accompanying drawings wherein:

Figure 5 is a graph in which the dry gas yield in wt. percent basis the fresh feed is plotted against reactor temperature.

The data on which the curves of the several graphs are based were obtained from a great number of runs in which gas oil stocks were subjected to fluid catalyst cracking in contact with a silica alumina catalyst under various conditions of temperature and pressure, catalyst to oil ratio and hourly weight of oil per weight of catalyst.

Figure 1:
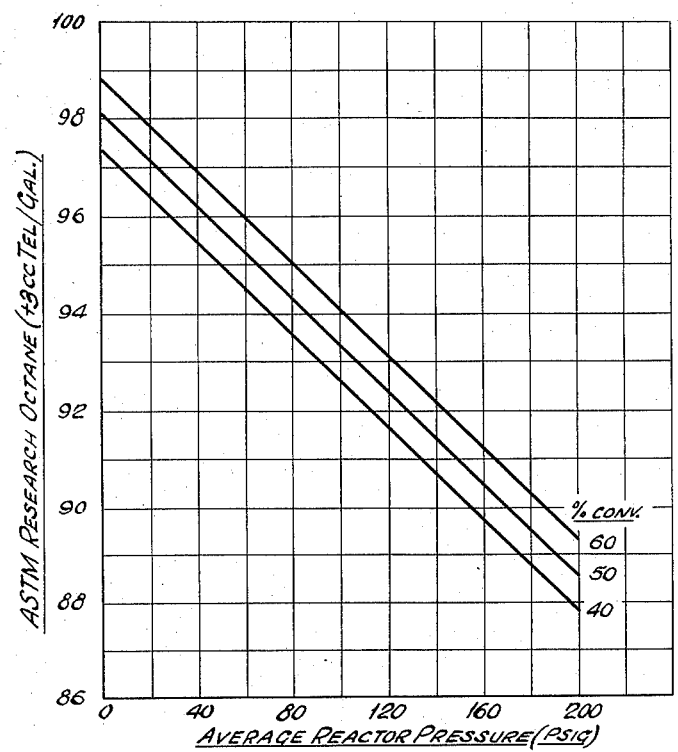
Figure 1 is a graph in which the octane number of the gasoline product is plotted against reactor pressure.

Referring now to Figure 1 in which the octane number is plotted against the reactor pressure, a temperature of 900° F. was taken as typical of temperatures within a range of about 850 to 1000° F. The curves at conversions of 40%, 50% and 60% indicate a very rapid reduction in octane number as the pressure is increased from atmospheric to 200 p. s. i. g. It would appear that increasing the reaction pressure in fluid catalyst cracking would not offer any promise for improving the operation in view of the rapid decrease in octane under increasing pressures.

Figure 2:
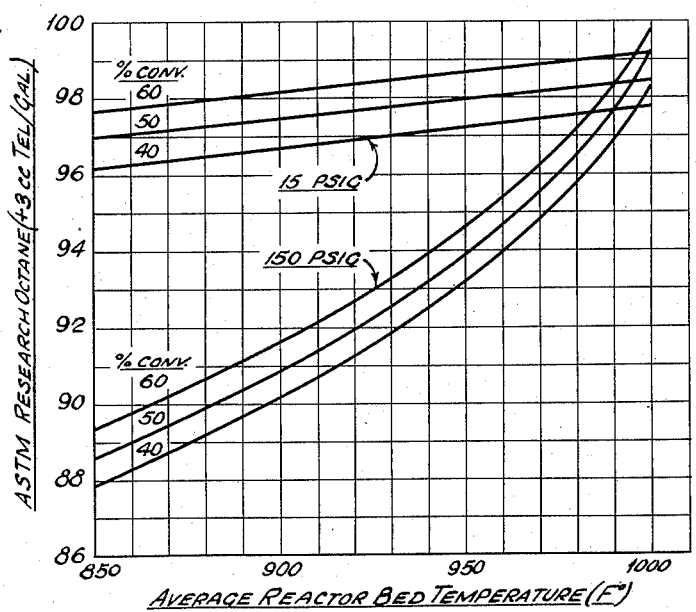
Figure 2 is a graph in which the octane number of the gasoline product is plotted against reaction temperatures.

In Figure 2 the octane of the gasoline product is plotted against reaction temperature. The octanes shown are those obtained by adding to the product gasoline 3 cc. tetraethyl lead per gallon but the curves do not differ significantly from those based on clear octanes. Two sets of curves are shown, one at 15 p. s. i. g. representing the typical fluid catalyst cracking operation and the other set at 150 p. s. i. g. Each set of curves includes operations at 40%, 50% and 60% conversion. The term "conversion" is used herein in accordance with the common usage in the industry. In determining the percent conversion the amount of liquid product which is higher boiling than that of the naphtha or gasoline product is taken as a percentage of the fresh charging stock to the operation. The naphtha product is usually taken as the liquid product boiling up to 430° F. end point and the higher boiling material, commonly called gas oil, is the higher boiling product which is taken as a percentage of the fresh charging stock. Subtracting the figure thus obtained from 100 gives a figure which is the percentage conversion. Thus the conversion figure includes the gas and carbon formed in the process as well as the naphtha. Actually, changes occur in the gas oil or higher boiling material, but the conversion figure obtained in this manner is readily determinable and furnishes a practical indication of the extent of conversion.

In Figure 2 it is shown that under 15 p. s. i. g. at typical conversions of 40%, 50% and 60% raising the temperature from 850 up to 1000° F. produces only very slight increases in the octane of the naphtha product. When it is considered that raising the temperature increases gas formation it is readily apparent that raising the temperature at 15 p. s. i. g. does not offer any promise of any material improvement in the fluid catalyst cracking operation. Now turning to the curves at 150 p. s. i. g. it will be seen that at this pressure the effect of raising temperature is drastically different from the effect of raising temperature at the low pressure. The increase in octane accompanying the increase in temperature under the high pressure is, in fact, so marked that by raising the temperature to around 990–1000° F. naphtha having octanes as high as those obtained in the low pressure operation are produced. This function of temperature under the increased pressure was entirely unexpected. The invention thus presents a method of materially increasing the yield of gasoline without the expected decrease in octane. The curves at 150 p. s. i. g. are typical of the curves obtainable at increased pressures above about 30 p. s. i. g. In general the higher the pressure the greater the effect of the application of increased temperatures.

Figure 3:
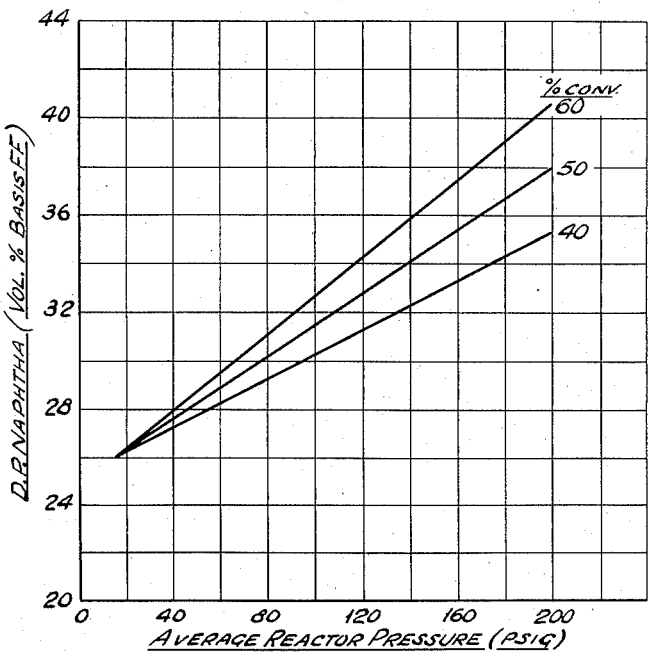
Figure 3 is a graph in which the yield of depentanized gasoline in volume percent based on the fresh feed is plotted against reactor pressure.

In Figure 3 the gasoline yield is plotted against reactor pressure. Curves at 40%, 50% and 60% conversion are shown which represent the results obtained at all temperatures within a range of about 850–1000° F. At each increase in conversion the yield of naphtha increases with rise in pressure and the rate of increase in naphtha yield is greater at the higher conversions. It was surprising to find that under the higher pressures each increase in conversion produced an increase in the yield of depentanized naphtha, since under the low pressures increasing conversion does not produce any appreciable increase in naphtha yield. It will be observed that the several conversion curves merge at a point of about 30 p. s. i. g.

Figure 4:
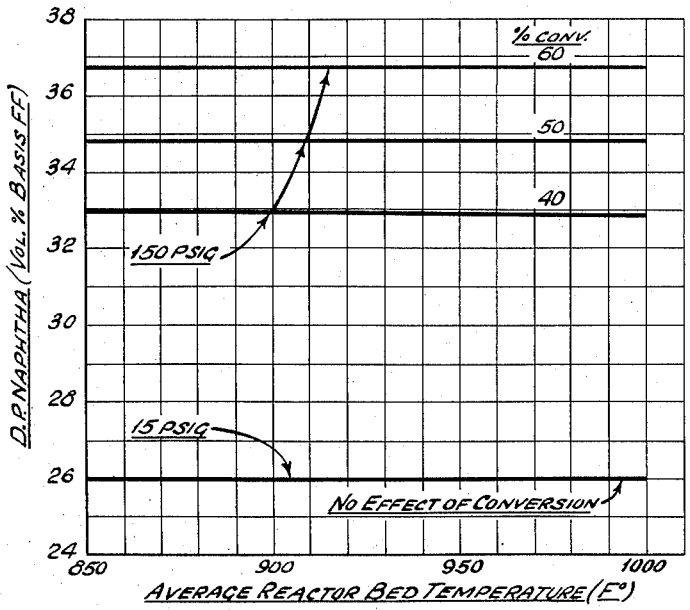
Figure 4 is a graph in which the yield of depentanized gasoline in volume percent basis fresh feed is plotted against reactor temperature.

In Figure 4 the yield of depentanized naphtha is plotted against reactor temperature. The curves show that temperature per se has no effect on naphtha yield. At 15 p. s. i. g. the yield of naphtha is not altered by changes in conversion. However, at 150 p. s. i. g. each increase in conversion produces an increase in naphtha yield. As shown in Figure 3 at pressures above about 30 p. s. i. g. the naphtha yield at all conversions increases rapidly as the pressure is increased.

Thus the combined showing of the several curves is that at pressures above about 30 p. s. i. g. when an increase in temperature accompanies an increase in pressure it is possible to obtain the expected advantages of the higher pressure but without the expected disadvantages. In other words, it is possible to obtain considerable increases in yield of naphtha of the same octane quality as is obtainable at the low pressure and even to obtain increased yields of naphtha of higher octane quality.

The fixed gas yield decreases as pressure is increased and the gas yield is increased with rises in temperature. However, as shown in Figure 5, the effect of the combined increase in pressure and temperature is favorable for the practice of the invention. Two sets of curves are shown, one at 15 p. s. i. g. and the other at 150 p. s. i. g. and each set includes conversions at 40%, 50% and 60%. It is shown that the decrease in gas yield due to the higher pressure generally more than offsets the increase in gas yield due to raising the temperature. Thus for example at 50% conversion the gas yield at 995° F. under 15 p. s. i. g. is 11 wt. percent while at 150 p. s. i. g. the yield is only 7 wt. percent, and at 900° F. under 15 p. s. i. g. the gas yield is 7.5 wt. percent while under 150 p. s. i. g. the gas yield is only 3.4 wt. percent.

In reference to coke yields it is found that increasing pressure per se does not result in increased yields of coke while increased temperatures do result in decreasing the coke yields so that there is no disadvantage in the invention with respect to yields of coke.

In a series of runs a comparison was made between a fluid catalyst cracking operation under 5 p. s. i. g. and 150 p. s. i. g. At 40% conversion the naphtha yields at 5 and 150 p. s. i. g. were 22 and 28 volume percent. At 70% conversion the yields of naphtha at 5 and 150 p. s. i. g. were 22 and 33.4 volume percent. These runs again show the function of increased conversion under the higher pressures in producing greater yields of naphtha.

In practicing the invention the oil is contacted with a cracking catalyst, such as a silica alumina catalyst, under fluidized conditions and under a sufficient pressure above 30 p. s. i. g. that increases in conversion will produce increases in gasoline yield and at a sufficiently high temperature to prevent the drop in octane number of the gasoline product which would otherwise accompany the increase in pressure above about 30 p. s. i. g. This temperature is generally upwards of 975° F. and is advantageously about 1000-1050° F. and up to around 1100° F. In order to obtain most favorable results the pressure is held at about 150 to 200 p. s. i. g. The ratio of the weight of the oil per hour per weight of catalyst is controlled under these pressures and temperatures to give the desired conversion and yield and octane of gasoline product.

In the table which follows conditions and results are given for several runs which are examples of the runs summarized in the graphs herein. The table shows the pressure (p. s. i. g.) and temperature in the reactor, the catalyst to oil ratio, the weight of catalyst per hour per weight of oil, the volume percent yield, based on the fresh feed, of depentanized naphtha of 400° F. end point and the ASTM octane by the research method including the clear octane and the octane after the addition of 3 cc. tetraethyl lead per gallon of naphtha.

| Run | A | B | C | D |
|---|---|---|---|---|
| Reactor Pressure | 19 | 14 | 150 | 150 |
| Reactor Temp., °F | 900 | 997 | 905 | 978 |
| Catalyst to Oil Ratio | 18.55 | 11.56 | 4.79 | 10.23 |
| W./Hr./W | 2.52 | 2.45 | 17.76 | 9.70 |
| Naphtha C$_6$—400° F., E. P., percent | 27.38 | 24.56 | 33.99 | 31.65 |
| Octane—A. S. T. M. Research: | | | | |
| Clear | 89.5 | 95.4 | 79.6 | 90.0 |
| +3 cc. TEL | 98.5 | 99.1 | 91.2 | 98.5 |

Runs A and B are typical of operations conducted below 30 pounds pressure and runs C and D are typical of operations at the higher pressures. These runs show the advantage of the process according to the invention in obtaining increased yields of gasoline without sacrifice of antiknock quality.

Obviously, many modifications and variations of the invention, as hereinbefore set forth, may be made without departing from the spirit and scope thereof, and therefore only such limitations should be imposed as are indicated in the appended claim.

We claim:

In the fluid catalytic cracking of a hydrocarbon oil, the improvement which comprises contacting said oil with a fluidized silica alumina cracking catalyst under cracking conditions including a pressure within the range of about 150 to 200 p. s. i. g. and a temperature in the range of 975 to 1100° F. effective to produce a gasoline in greater yield and having an octane number at least as high as that produced by fluid catalytic cracking of said oil at a pressure below about 30 p. s. i. g.

References Cited in the file of this patent

UNITED STATES PATENTS

| 2,414,736 | Gray | Jan. 21, 1947 |
| 2,456,148 | Read | Dec. 14, 1948 |
| 2,585,238 | Gerhold | Feb. 12, 1952 |

OTHER REFERENCES

"Advances in Catalysis," Academic Press, Inc., New York, N. Y. (1954), pages 408 to 410, vol. VI.